United States Patent [19]

Ashworth

[11] Patent Number: 4,640,037

[45] Date of Patent: Feb. 3, 1987

[54] TRAWL DOORS

[76] Inventor: John F. H. Ashworth, Ashlands Farm, East Drayton, Retford, Nottinghamshire DN22 OLF, United Kingdom

[21] Appl. No.: 471,027

[22] Filed: Mar. 1, 1983

[30] Foreign Application Priority Data

Mar. 2, 1982 [GB] United Kingdom ................ 8206130

[51] Int. Cl.⁴ ............................................. A01K 73/02
[52] U.S. Cl. ........................................................... 43/9
[58] Field of Search ................................................ 43/9

[56] References Cited

U.S. PATENT DOCUMENTS

| 2,066,519 | 1/1937 | Clark | 43/9 |
| 2,689,425 | 9/1954 | De Veen | 43/9 |
| 2,797,521 | 7/1957 | Bowen | 43/9 |
| 2,942,371 | 6/1960 | Johnson et al. | 43/9 |
| 3,372,507 | 3/1968 | Luketa | 43/9 |
| 3,410,014 | 11/1968 | Jenssen | 43/9 |

FOREIGN PATENT DOCUMENTS 10047 8/1962 Norway .................................. 43/9

Primary Examiner—M. Jordan
Attorney, Agent, or Firm—H. Mathews Garland

[57] ABSTRACT

A member (3) is pivotally mounted on the inner face of a trawl door 1, and said member can be attached to a trawl warp which is attached to a trawler. A resilient connection (12) is provided between the member and a point on the inner face of the trawl door. The outer face of the trawl door is provided with a backstrop (42) fixed to the trawl door through an aperture (33). A resilient attachment (42a) is connected between the backstrop and a further aperture (38).

9 Claims, 6 Drawing Figures

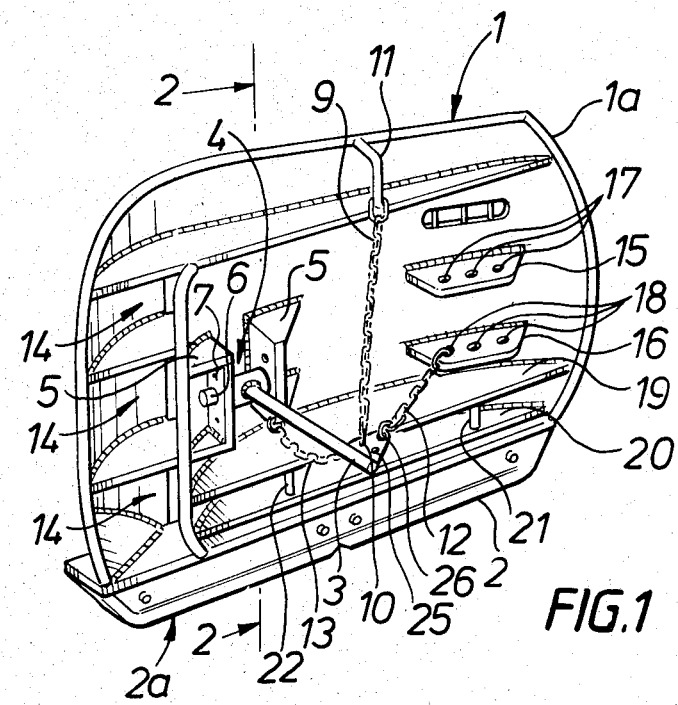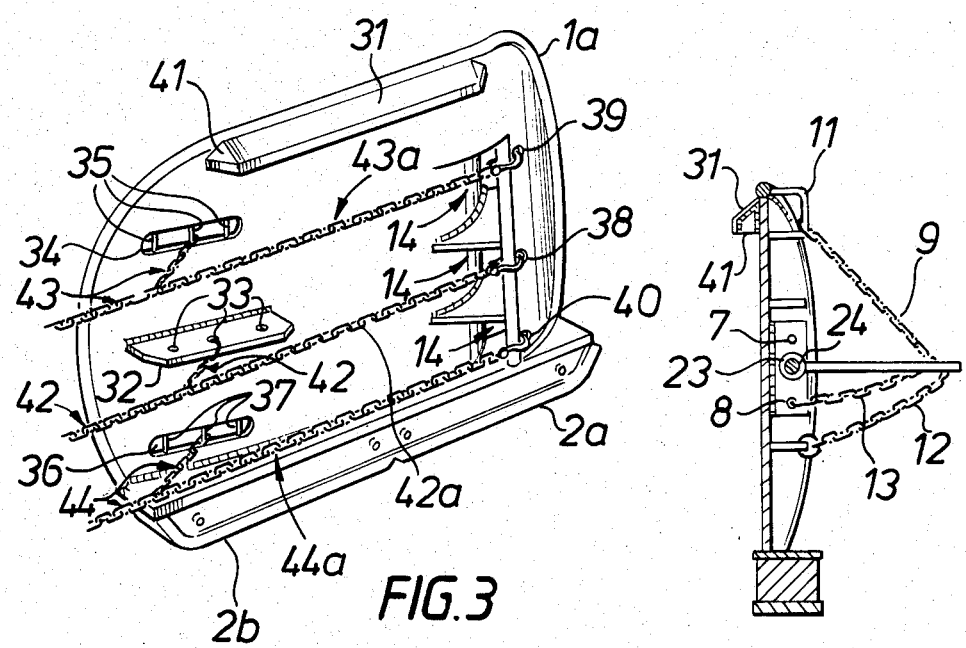
FIG.1
FIG.3
FIG.2

TRAWL DOORS

This invention relates to trawl doors (sometimes called "trawl boards" or "otter boards"), including intermediate doors (sometimes called "pony doors"), which are used to control the trawls used in trawling.

Despite the widespread use of trawl doors in trawling there are still a number of hitherto insoluble problems associated with their use. When the door is in operation it is not an infrequent occurrence for it to fall flat onto its face or onto its back. Once this situation has arisen it can be very difficult to get the doors back into operation without first hauling them back to the trawler. It will be readily appreciated that this is a lengthy and time consuming process.

Furthermore, after some time in operation the shoe at the base of the trawl door wears down, causing the door to lean backwards in the water. This is a highly undesirable effect which has in the past only been soluble by changing the shoe.

The process of dropping the trawl doors into the water from the trawler is known as shooting. There are a number of problems associated with shooting which are particularly troublesome when using doors which possess good hydrodynamic properties. One such problem is that during shooting the trawl doors may move towards one another, instead of moving apart. Another problem is that each door may not be able to maintain a substantially constant orientation with respect to their direction of travel.

An object of the present invention is to provide an improved trawl door which may be employed in bottom fishing and pelagic fishing, and which will overcome these aforementioned problems.

According to one aspect of the invention there is provided a trawl door comprising a body, having inner and outer faces and having forward and rearward ends, the inner face having a member pivotably mounted thereon, said member including means for attaching a trawl warp, and a resilient connection is provided between the member and a point on the inner face between the member and the rearward end.

Advantageously the member can pivot about a first axis which extends lengthwise of the body.

Preferably the member can pivot about a second axis which is substantially perpendicular to the first axis and is substantially parallel to the plane of the inner face.

Desirably the member is adjustably mounted on the inner face.

In one embodiment first restriction means can be provided between the member and a point remote from the first pivotal axis, whereby in use, the first restriction means is in tension when the trawl door leans backwards in the water and the warp is simultaneously in tension.

A further restriction means can be provided between the member and a point remote from the first pivotal axis, whereby, in use, the restriction means cooperate to prevent the member lying flat against the inner face.

According to another aspect of the invention there is provided a trawl door comprising a body having inner and outer faces and having forward and rearward ends, the outer face having at least one backstrop attached thereto, and a resilient attachment being provided between at least one backstrop and a point on the outer face.

Advantageously the or each backstrop is attached to the trawl door adjacent the rearward end of the door, and the or each resilient attachment is attached to the trawl door adjacent the forward end of the door.

Preferably the resilient connection, the restriction means and the resilient attachments are resilient chains such as drag alloy chains, so that they will stretch and deform rather than break, the deformed sections being replaced when necessary. Alternatively, they may be made from a resilient wire or a resilient rope.

Reference is now made to the accompanying drawings in which:

FIG. 1 is a perspective view of the inner face of one embodiment of a trawl door looking from the forward end of the door;

FIG. 2 is a section upon the line 2—2 of FIG. 1;

FIG. 3 is a perspective view of the outer face of the trawl door looking from the rearward end of the door;

Figure 4:
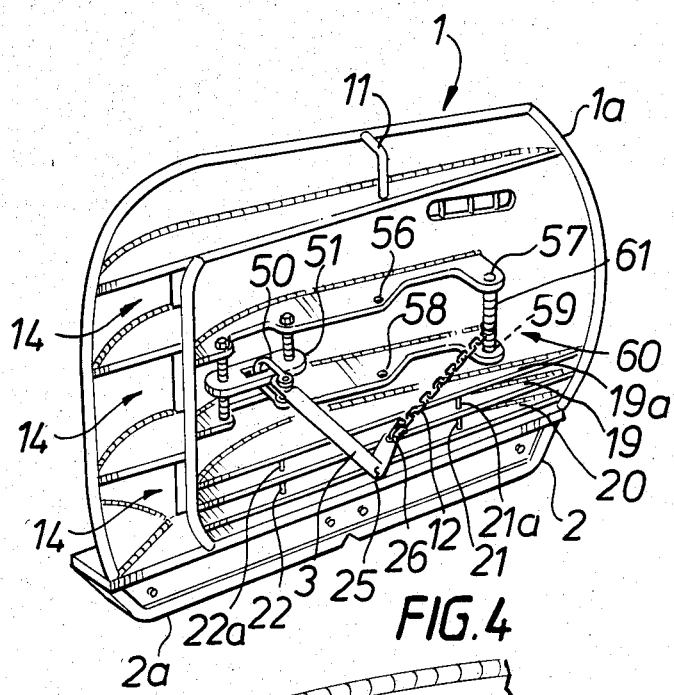
FIG. 4 is a perspective view of an alternative embodiment of a trawl door according to the invention.

Referring to FIGS. 1 and 2 a trawl door generally designated 1 comprises a body 1a at the base of which are two shoes 2 and 2a which can be detached from the body and replaced when necessary.

A member 3 is mounted on hinges generally designated 4, which are mounted on flanges 5 through holes 6. The hinges could alternatively have been mounted on flanges 5 using holes 7.

A first restriction means 9 is affixed between aperture 10 and hook 11. The restriction means 9 can include a G-link (not shown) which is used to break the restriction means so that the bracket may lie flat when in storage. A further restriction means 13 is affixed between aperture 10 and hole 8.

A resilient connection 12 is attached between hole 26 on the member and one of holes 17 on flange 15 or on one of holes 18 on flange 16.

A slot 14 which contributes towards the good hydrodynamic properties of the door is situated at the forward end of the trawl door. The trawl warp (not shown) would be connected to the trawl door through aperture 25 and would also be be affixed to the trawler (not shown).

There are flanges 19 and 20 provided near the base of the inner face of the trawl door. Between these flanges ballast may be stored. Removable pins 21 and 22 serve the purpose of holding the ballast in position.

The hinges 4, comprise an annular cylinder 23 which is mounted on a pin 24. The internal diameter of the cylinder 23 is greater than the external diameter of the pin 24 in order to allow pivoting of the member 3 about an axis perpendicular to the axis of the pin. The inner side of the cylinder 23 is chamfered at both ends in order to heighten this effect.

Referring now to FIG. 3, a fin 31 is attached to the outer face of the body 1a, with a fillet 41 at each end of the fin. Also on the outer face of the body 1a there is a flange 32 provided with holes 33. There are two apertures 34 and 36 cut through the trawl door which are provided with bars 35 and bars 37 respectively. Near the front end of the door there are apertures 38, 39 and 40.

When the trawl door is to be used on fine ground then single backstrops would be used. In this case a single backstrop 42 is connected to the trawl door through one of the holes 33 and a resilient attachment 42a is attached between the backstrop 42 and aperture 38.

When the trawl door is to be used on rough ground then double backstrops should be used. Here backstrop 43 is connected to the trawl door using one of the bars 35, and a resilient attachment 43a is attached between backstrop 43 and aperture 39. In addition a further backstrop 44 is connected to the trawl door using one of bars 37, and a resilient attachment 44a is attached between backstrop 44 and aperture 40. When using double backstrops it may be desirable to use only one of the resilient attachments 43a and 44a.

Although FIG. 3 is shown with three backstrops, in practice either backstrop 42 (single backstrop) would be used or backstrops 43 and 44 would be used (double backstrops).

The trawl door shown in FIG. 4 is similar to that of FIG. 1, but the means of mounting the member 3 on the inner face of the door is different. The member 3 is attached to a D-link 50 which passes through an apertured bar 51. The bar 51 is mounted on rods 52 which are in turn mounted upon flanges 53 and 54. The rods 52 are surrounded by washers 55, and the washers can be removed in order to alter the position of the bar 51 with respect to the flanges 53 and 54. The resilient connection 12 is attached to a pin generally designated 60 which fits between apertures 57 and 59. The pin 60 is surrounded by washers 61, and the washers are removable so that the point at which the resilient connection 12 is attached to the pin can be altered. It is also posible to located the pin 60 between apertures 56 and 58.

The trawl door is shown provided with an additional flange 19a, so that extra ballast may be stored between the flanges 19 and 19a. Additional pins 21a and 22a are provided to hold the ballast in place.

The trawl doors can be lifted by attaching a rope around hook 11. The hook 11 is positioned so that the trawl door will hang substantially vertically as it is lifted through the air. The purpose of fin 31 is so that during shooting the pair of trawl doors move apart and do not move together. Fin 31 also ensures that the forward end of the trawl door stays higher than the rearward end, when the doors are in the water. When using the embodiment of trawl door shown in FIGS. 4 to 6, the fin 31 may be omitted without any significant disadvantages.

It is important that the trawl doors maintain a substantially constant orientation with respect to their direction of travel. The resilient connection 12 transmits some of the pulling force from the trawler to the rear of the trawl door which helps to prevent it from swinging outwards. The drag force from the trawl, applied to the door through the backstrops is also used to preserve the correct orientation of the door. If the rear of the door has swung outwards, then provided the angle between the plane of the door and the direction of travel is less than about 30° then the drag force from the trawl is transmitted to the rear end of the door through the backstrop 42. If this angle exceeds about 30° then resilient attachment 42a will become in tension. This transmits the drag force from the warp to the front of the trawl door and helps to reorient the door. Similar considerations apply if double backstrops are used instead of a single backstrop.

When in operation, if a trawl door begins to fall on its inner face then the angle between the member 3 and the part of the body below the hinges will increase. When this angle reaches about 150° then restriction means 13 will become taut, hence preventing any further increase in the angle. Therefore, the trawl door will not be able to fall flat on its inner face but is kept at an angle of at least 30° to the seabed. The practical result of this is that the door will be able to pick itself up.

Alternatively, if a door falls flat on its outer face then providing that the warp is in tension the restriction means 9 will also be in tension. This alters the point of action of the force applied by the trawler on the trawl door to a point near to where the restriction means 9 is attached to the body. This enables the door to pick itself up off its outer face. The restriction means 9 preferably is of such length that the angle between the plane perpendicular to the body, parallel to and passing through the longitudinal axis of the hinges, and the member 3 can not exceed 10°.

A further requirement for the correct operation of the doors is that they do not lean backwards while in the water. Each trawler must have its trawl doors calibrated to its particular needs in order to prevent this effect. Hence the alternative positions for the hinges allow each trawler to provide some crude calibration of the doors to its individual requirements. If the hinges are moved higher the tendency to lean backwards is reduced. If the hinges are moved lower, the tendency to lean backwards is increased. However, this method of calibration is too crude to deal with the problem when it is caused by the slow process of the wearing down of the shoe. In order to deal with this problem the length of the restriction means 9 can be shortened.

Figure 5:
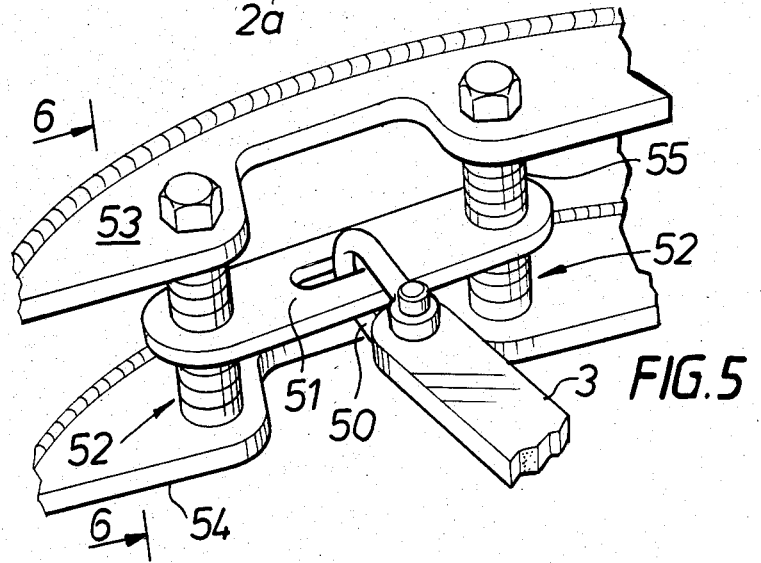
FIG. 5 is an enlarged perspective view of a part of the trawl door shown in FIG. 4.
Figure 6:
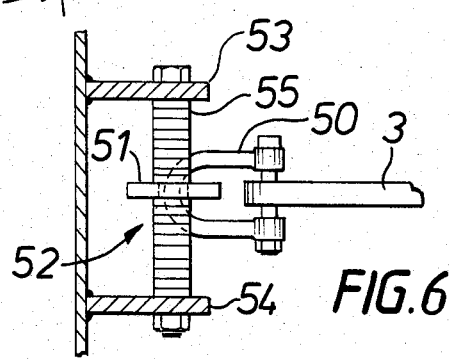
FIG. 6 is a section upon the line 6—6 of FIG. 5.

The embodiment of trawl doors shown in FIGS. 4 to 6 can fulfill similar functions to that shown in FIGS. 1 and 2, despite the absence of restriction means 9 and 13. The D-link 50 and the bar 51 cooperate to provide some restriction of movement of the member 3. In addition, the position of the bar 3 can be adjusted very precisely upon the rods 52. This precision enables the trawl door to be accurately calibrated which lessens the need for restriction of the member 3, since the trawl door is less prone to lean forwards or backwards.

When the trawl doors are to be pulled more quickly through the water it is desirable to increase their weight. The flanges 19 and 20 allow enough ballast to be added to increase the weight of the trawl doors by up to 30%, and in a preferred embodiment up to 45%. The additional flange 19a allows the addition of sufficient ballast to increase the weight of the trawl doors by up to 60%, and in a preferred embodiment up to 90%. In addition, the pin 60 should be attached between apertures 56 and 58, rather than 57 and 59, when the doors are to be pulled more quickly through the water.

It will be appreciated that the present invention has several advantages over the prior art. For example, the invention economises on time and money by alleviating the problems of the trawl door adopting undesirable positions. For instance, by preventing the trawl doors from leaning backwards efficiency is increased and savings are made both in terms of less wear and tear on the trawl door, and of less fuel consumption by the trawler. Moreover the invention effects further economy by prolonging the useful life of the shoe, and keeps the trawl door at the correct angle in the water for maximum spreading force. Furthermore, the invention is ideal for use with doors of good hydrodynamic design and enables the same doors to be used for catching different species on different grounds, hence resulting in further benefits from the use of such doors.

I claim:

1. A trawl door comprising a body having inner concave and outer convex faces and having forward and rearward ends, a rigid bar member pivotally mounted on said inner face of said body for movement about a first axis extending lengthwise of said body, mounting means between the said bar member and said inner body face for mounting said bar member at a plurality of different lateral positions to calibrate said door to different operating conditions, means connected with said bar member for attaching a trawl warp to said bar member from a trawler, means on said outer face to said door to attach backstrops which are attachable to a trawl, and a resilient connection is provided between said bar member and a point on the inner face between said bar member and the rearward end.

2. A trawl door according to claim 1 in which the bar member can pivot about a second axis which is substantially perpendicular to the first axis and is substantially parallel to the plane of the inner face.

3. A trawl door according to claim 2 in which first flexible restriction means is provided between the bar member and a point remote from the first pivotal axis, whereby, in use, the first restriction means is in tension when the trawl door leans backwards in the water and warp is simultaneously in tension.

4. A trawl door according to claim 3 in which further restriction means is provided between the bar member and a point remote from the first pivotal axis, whereby, in use, the restriction means cooperate to prevent the member lying flat against the inner face.

5. A trawl door according to claim 1 in which the resilient connection is a resilient chain, wire or rope.

6. A trawl door according to claim 4 in which the restriction means are a resilient chain wire or rope.

7. A trawl door according to claim 1 which includes curved slot means opening through said body between said faces adjacent the forward end sloping rearwardly from said inner face to said outer face in order to give improved hydrodynamic properties.

8. A trawl door according to claim 7 including a longitudinal fin along the outer face of said door adjacent the upper edge thereof for guiding said door during shooting and to maintain the forward end of said door higher than the rearward end of said door when said door is pulled in water.

9. A trawl door according to claim 8 wherein said fin slopes downwardly and outwardly toward the lower edge of said door and is provided with a fillet at opposite ends thereof.

* * * * *